(12) United States Patent
Chang

(10) Patent No.: US 7,665,914 B2
(45) Date of Patent: Feb. 23, 2010

(54) IRIS DIAPHRAGM ACTUATOR, MAGNETIC POSITION SENSING STRUCTURE AND ARRANGEMENT METHOD THEREOF

(75) Inventor: Chii-How Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 458 days.

(21) Appl. No.: 11/491,895

(22) Filed: Jul. 25, 2006

(65) Prior Publication Data
US 2007/0031144 A1 Feb. 8, 2007

(30) Foreign Application Priority Data
Aug. 4, 2005 (TW) .............................. 94126511 A

(51) Int. Cl.
*G02F 1/00* (2006.01)
*G03B 9/00* (2006.01)
*G02B 9/08* (2006.01)
*H02K 29/08* (2006.01)

(52) U.S. Cl. ..................... 396/506; 396/457; 396/458; 359/739; 318/400.38

(58) Field of Classification Search ......... 396/505–510, 396/493–495, 449, 455–458; 348/363; 359/738, 359/739; 318/400.38
See application file for complete search history.

(56) References Cited

U.S. PATENT DOCUMENTS 5,258,874 A * 11/1993 Bajat et al. ................. 359/894
2005/0001570 A1 * 1/2005 Lee et al. .................... 318/254

\* cited by examiner

*Primary Examiner*—Rochelle-Ann J Blackman
(74) *Attorney, Agent, or Firm*—Birch, Stewart, Kolasch & Birch, LLP

(57) ABSTRACT

An iris diaphragm actuator includes a magnetic position sensing structure, at least one driving element and a light intercepting element. The magnetic position sensing structure includes a magnetic element and a magnetic sensor relatively disposed. The driving element connects and drives the magnetic element or the magnetic sensor to perform a rotating motion with respect to a rotation center such that the distance and angle between the magnetic element and the magnetic sensor are changed so as to obtain a substantially linear relation between a magnetic flux sensed by the magnetic sensor and the position of the magnetic element. Also, an arrangement method of a magnetic position sensing structure is disclosed.

17 Claims, 9 Drawing Sheets

IRIS DIAPHRAGM ACTUATOR, MAGNETIC POSITION SENSING STRUCTURE AND ARRANGEMENT METHOD THEREOF

This Non-provisional application claims priority under 35 U.S.C. §119(a) on Patent Application No. 094126511 filed in Taiwan, Republic of China on Aug. 4, 2005, the entire contents of which are hereby incorporated by reference.

BACKGROUND OF THE INVENTION

1. Field of Invention

The invention relates to a magnetic position sensing structure and an arrangement method thereof. In particular, the invention relates to a magnetic position sensing structure for an iris diaphragm actuator and an arrangement method thereof.

2. Related Art

Technological advances lead to higher demands for image capturing and processing. Conventionally, the iris diaphragm using a magnet and a magnetic position sensor to convert the magnetic flux sensed by the magnetic position sensor into a voltage output signal. However, a linear relation can not be obtained between the magnetic flux (or voltage) and the position of the magnet owing to inappropriate arrangement of the structure. Therefore, it is necessary to use a nonlinear driving device or a calibration method to adjust to obtain a linear relation, which increases the complexity and the cost of the structure. Alternatively, a plurality of magnets are applied in changing so as to adjust the magnetic flux sensed by the magnetic position sensor into a linear relation. However, this also increases the complexity and the cost of the structure.

FIGS. 1A and 1B show a conventional magnetic position sensing structure using a magnet 11 and a Hall sensor 12. When the magnet 11 moves along a motion direction, the distance "d" decreases and the magnetic flux density increases. However, the magnetic flux density and the distance "d" have a nonlinear relation.

FIGS. 2A and 2B show another conventional magnetic position sensing structure using a magnet 11 and a Hall sensor 12. When the magnet 11 moves along a motion direction, the distance "d" decreases and the magnetic flux density increases. However, the magnetic flux density and the distance "d" also have a nonlinear relation.

FIGS. 3A and 3B show a magnetic position sensing structure using two magnets 11 and a Hall sensor 12. When the Hall sensor 12 moves along a motion direction, the relation between the magnetic flux density and the distance "d" is more linear than the previous two examples in FIGS. 1A and 2A. However, because there are required more magnets, this results in a more complex structure and higher cost.

FIGS. 4A and 4B show a magnetic position sensing structure using four magnets 11 and a Hall sensor 12. When the Hall sensor 12 moves along a motion direction, the relation between the magnetic flux density and the distance "d" is more linear than the previous two examples in FIGS. 1A and 2A. However, even more magnets are used, and likewise, it has a more complex structure and higher cost.

It is therefore an important subject to provide an iris diaphragm actuator, a magnetic position sensing structure, and an arrangement method thereof that have simple structures, easy manufacturing processes, high production yield, low product costs, and no product variations.

SUMMARY OF THE INVENTION

In view of the foregoing, the invention is to provide an iris diaphragm actuator, a magnetic position sensing structure and an arrangement method thereof. With only a simple magnetic device being used, the relation between the signal output of the magnetic position sensing structure is substantially more linear than the prior art. The invention can have advantages of simple structures, easy manufacturing processes, high production yield, low product costs, and no product variations.

To achieve the above, the invention discloses an iris diaphragm actuator including a magnetic position sensing structure, at least one driving element, and a light intercepting element. The magnetic position sensing structure includes a magnetic element and a magnetic sensor relatively disposed. The driving element connects and drives the magnetic element or the magnetic sensor to perform a rotating motion with respect to a rotation center so that the distance and angle between the magnetic element and the magnetic sensor are changed to obtain a substantially linear relation between a magnetic flux sensed by the magnetic sensor and the position of the magnetic element.

To achieve the above, the invention also discloses a magnetic position sensing structure including a magnetic element and a magnetic sensor relatively disposed. In the embodiment, the magnetic element or the magnetic sensor performs a rotating motion with respect to a rotation center so that the distance and the angle between the magnetic element and the magnetic sensor change simultaneously. Thus, a distance and an angle between the magnetic element and the magnetic sensor are changed so as to obtain a substantially linear relation between a magnetic flux sensed by the magnetic sensor and the position of the magnetic element.

In addition, the invention also discloses an arrangement method of a magnetic position sensing structure, which includes steps of: providing a magnetic element and a magnetic sensor relatively disposed; rotating the magnetic element or the magnetic sensor with respect to a rotation center so that a distance and an angle between the magnetic element and the magnetic sensor are changed simultaneously; adjusting the position of the magnetic element or the magnetic sensor in a complementary way to obtain a substantially linear relation between the magnetic flux sensed by the magnetic sensor and the position of the magnetic element; and fixing the initial relative positions of the magnetic element and the magnetic sensor.

As mentioned above, the invention discloses an iris diaphragm actuator, its magnetic position sensing structure and the arrangement method thereof. A single magnetic element or magnetic sensor is disposed with respect to a rotation center. By considering of the inverse square relation between the distance and the magnetic flux between the magnetic element and the magnetic sensor and the cosine relation with the angle in between (as equation (1)), the distance and the angle between the magnetic element and the magnetic sensor are changed to obtain a substantially linear relation between the signal output of the magnetic position sensing structure and the position. The equation (1) is expressed as follow:

$$\phi = \int B \cdot dA = BA \cos \theta \qquad (1)$$

wherein, $\phi$ is the magnetic flux, B is a magnetic flux density vector, dA is a unit area vector of the magnetic flux density sensing region of the magnetic sensor, and $\theta$ is the angle between the magnetic flux density sensing region and the magnetic flux density vector. Because it is possible to use a traditional linear driving device and method in the invention, the invention thus achieves the goals of simple structures, easy manufacturing processes, high production yield, low product costs, and no product variations.

BRIEF DESCRIPTION OF THE DRAWINGS

The invention will become more fully understood from the detailed description given herein below illustration only, and thus is not limitative of the present invention, and wherein:

FIGS. 3A and 3B are a schematic view showing another conventional magnetic position sensing structure having two magnets and a Hall sensor, and a graph showing the relation between the magnetic flux density and the distance in between;

FIGS. 4A and 4B are a schematic view showing further another conventional magnetic position sensing structure having four magnets and a Hall sensor, and a graph showing the relation between the magnetic flux density and the distance in between;

DETAILED DESCRIPTION OF THE INVENTION

The present invention will be apparent from the following detailed description, which proceeds with reference to the accompanying drawings, wherein the same references relate to the same elements.

Figure 1A:
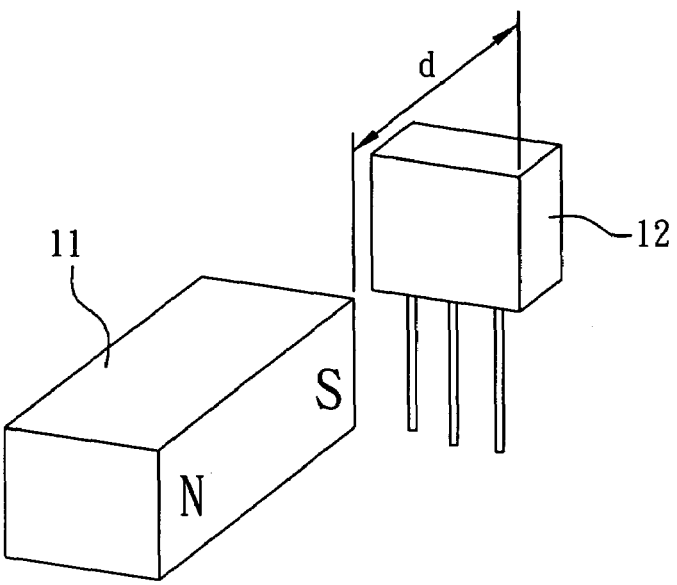
FIGS. 1A and 2A are schematic views showing two conventional magnetic position sensing structure having a magnet and a Hall sensor.
Figure 1B:
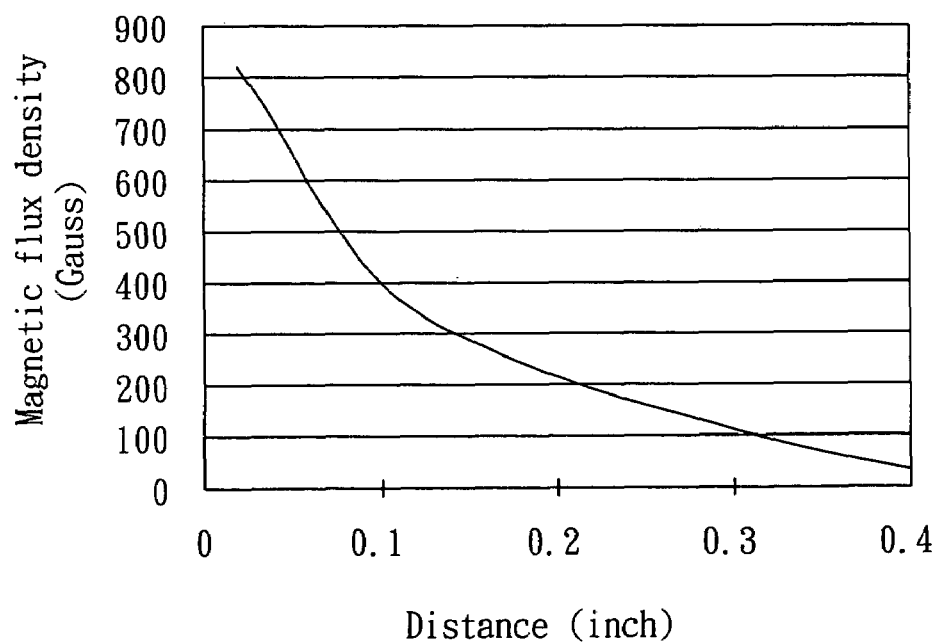
FIGS. 1B and 2B are two graphs showing the relation between the magnetic flux density and the distance between the magnet and the Hall sensor according to FIGS. 1A and 2A, respectively.
Figure 2A:
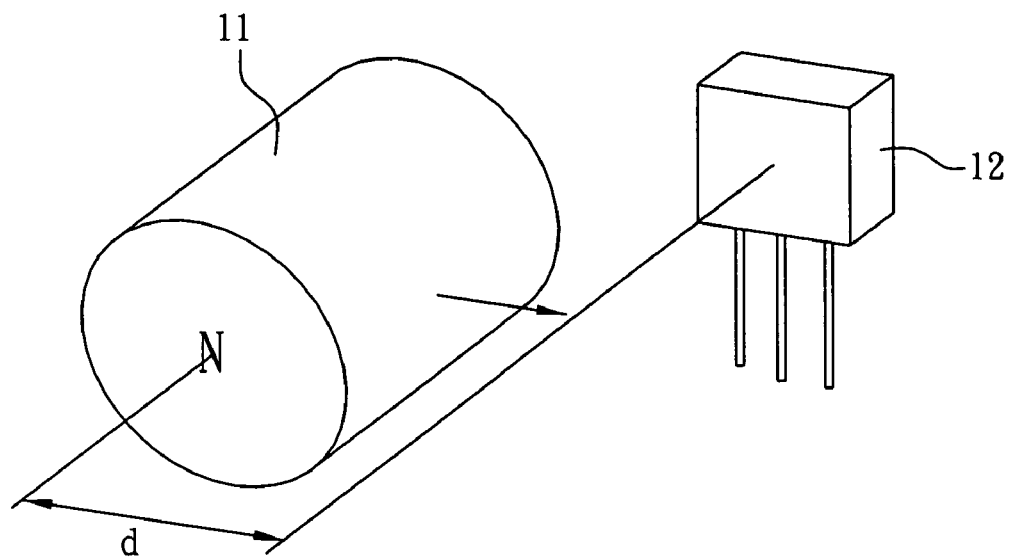
Figure 2B:
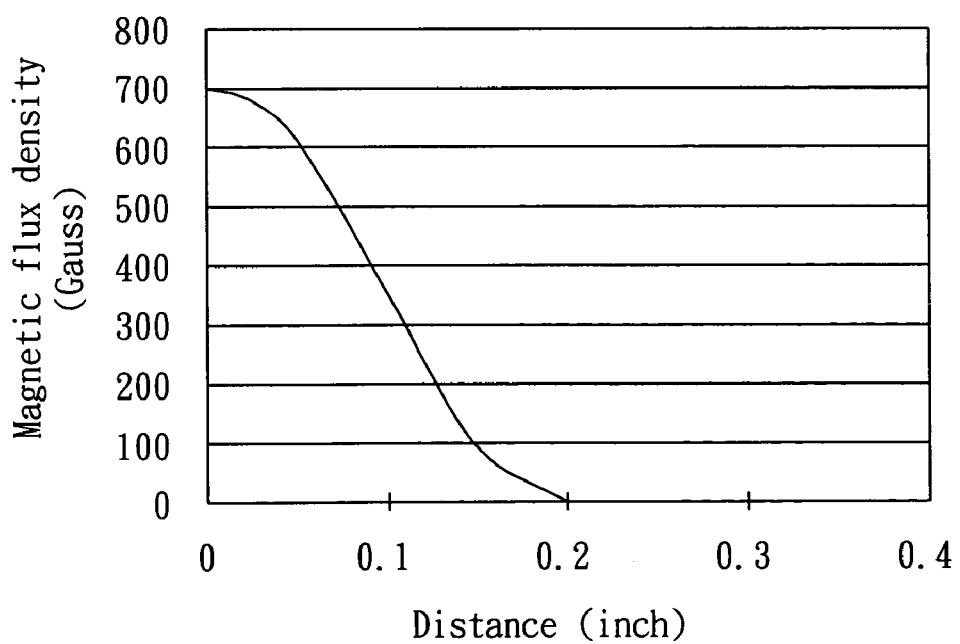
Figure 3A:
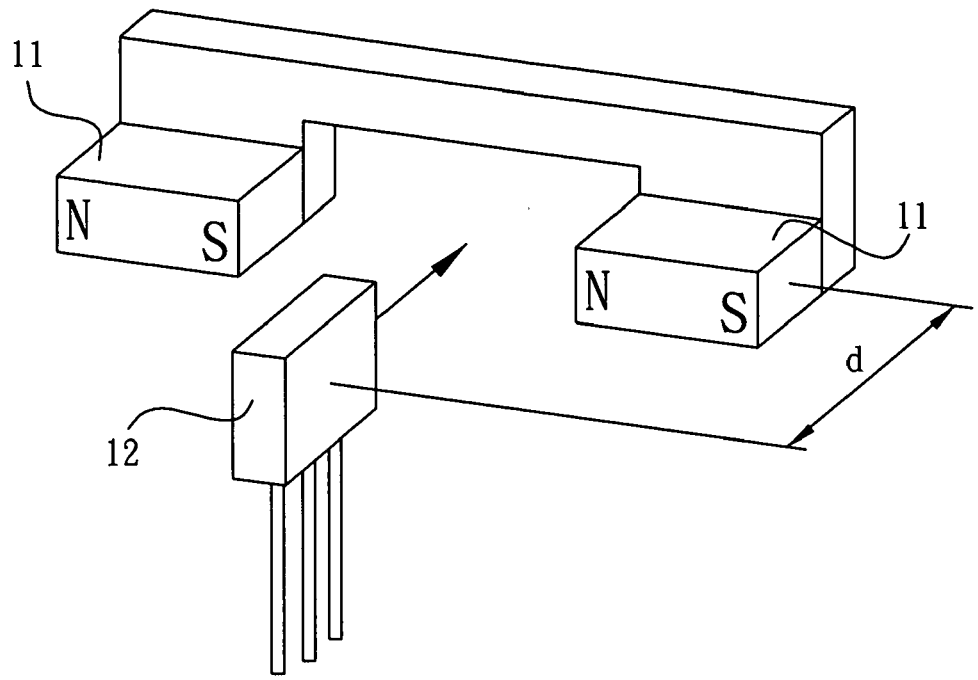
Figure 3B:
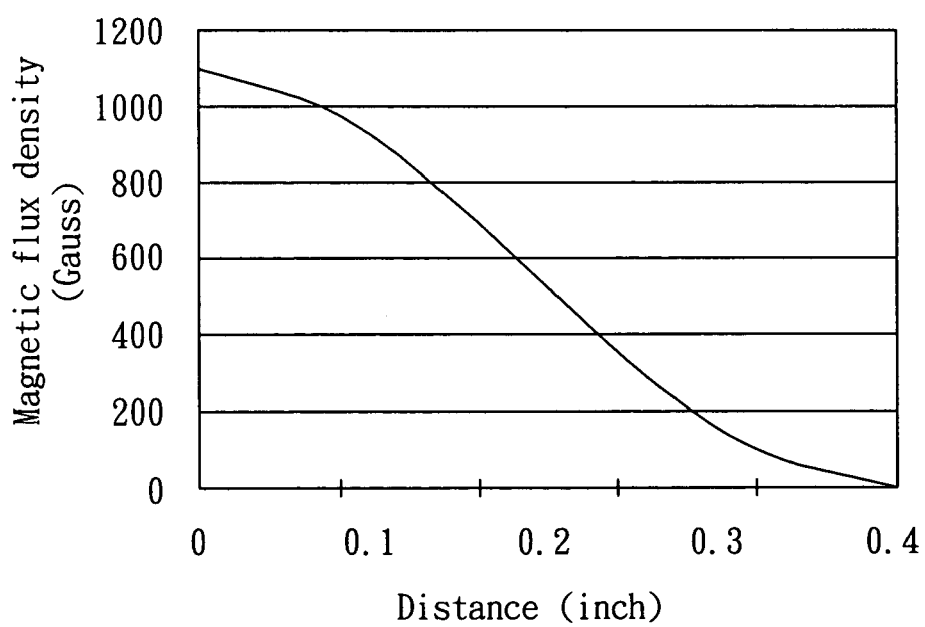
Figure 4A:
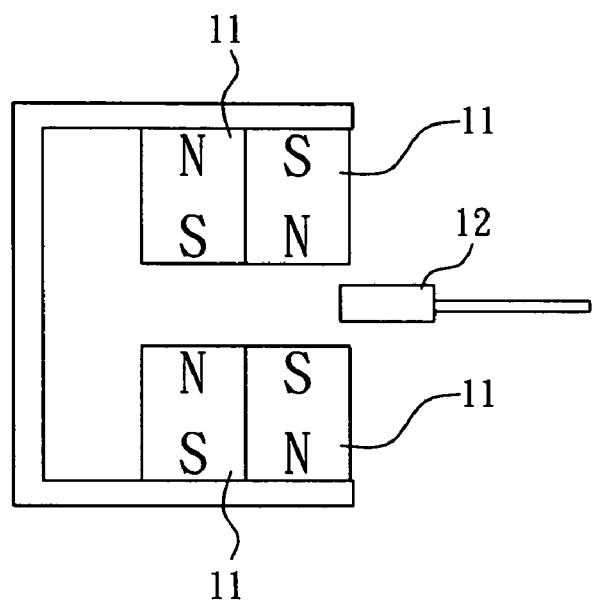
Figure 4B:
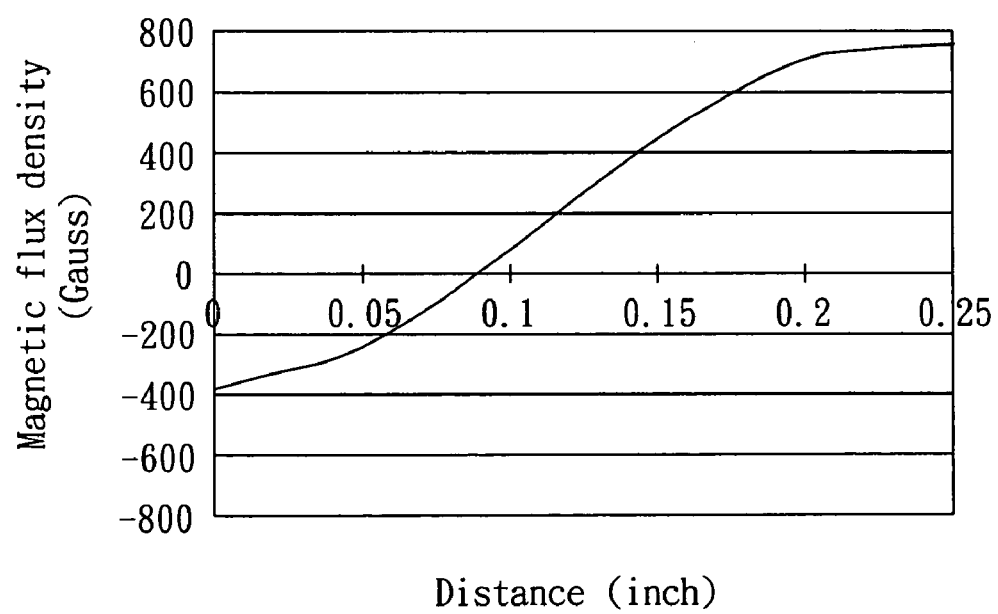
Figure 5:
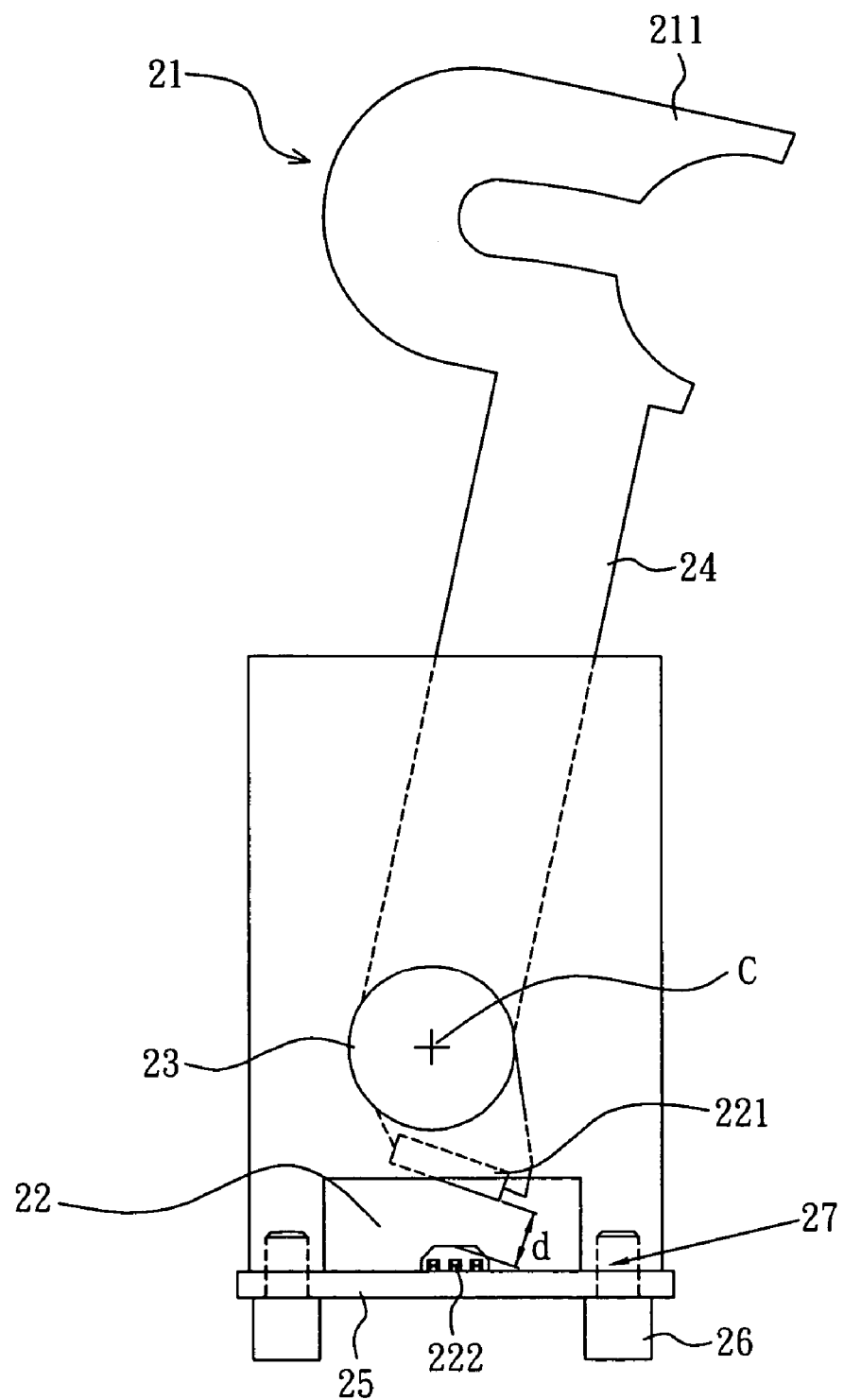
FIGS. 5 to 7 are schematic views of an iris diaphragm actuator according to a preferred embodiment of the invention and the relative motion between the magnetic element and the magnetic sensor in a magnetic position sensing structure of the iris diaphragm actuator.

With reference to FIG. 5, an iris diaphragm actuator 2 according to a preferred embodiment of the invention includes a light intercepting element 21, a magnetic position sensing structure 22, and a driving element 23. The light intercepting element 21 has at least one light intercepting portion 211 and is connected to the driving element 23 by a connecting portion 24.

The magnetic position sensing structure 22 includes a magnetic element 221 and a magnetic sensor 222. The driving element 23 is coupled to the magnetic element 221 or the magnetic sensor 222 and drives the magnetic element 221 or the magnetic sensor 222 to rotate with respect to a rotation center "C" according to an action signal of a control system (not shown). It also drives the light intercepting element 21 to control the size of the iris diaphragm.

In this embodiment, the magnetic sensor 222 is fixed on a circuit board 25. The driving element 23 drives the magnetic element 221 to rotate with respect to the rotation center "C" so as to produce a relative motion between the magnetic element 221 and the magnetic sensor 222. Alternatively, the driving element 23 can drive the magnetic sensor 222 to rotate with respect to the rotation center "C" so as to produce a relative motion between the magnetic sensor 222 and the magnetic element 221.

The magnetic sensor 222 may be a non-contact magnetic sensor, which is a magnetic sensor that can detect the magnetic field of the magnetic element 221 without being in contact with it. For example, the magnetic sensor 222 is, but not limited to, a Hall sensor or a magneto-resistive sensor.

The iris diaphragm actuator 2 of the embodiment further includes at least one adjusting mechanism 27 disposed between the magnetic element 221 and the magnetic sensor 222, as shown in FIG. 5. The adjusting mechanism 27 is used to adjust the initial relative positions of the magnetic element 221 and the magnetic sensor 222, which avoids accumulating errors of the magnetic element 221 and the magnetic sensor 222 and prevent the following problem of poor production quality of the iris diaphragm actuator 2. In addition, the adjusting mechanism 27 includes an elastic element such as, but not limited to, a spring.

Further, the iris diaphragm actuator 2 of the embodiment includes at least one fixing element 26 for fixing the relative position of the magnetic element 221 and the magnetic sensor 222. The fixing method of the fixing element 26 can be, but not limited to, screw fastening, adhesion, coupling, or locking.

Figure 6:
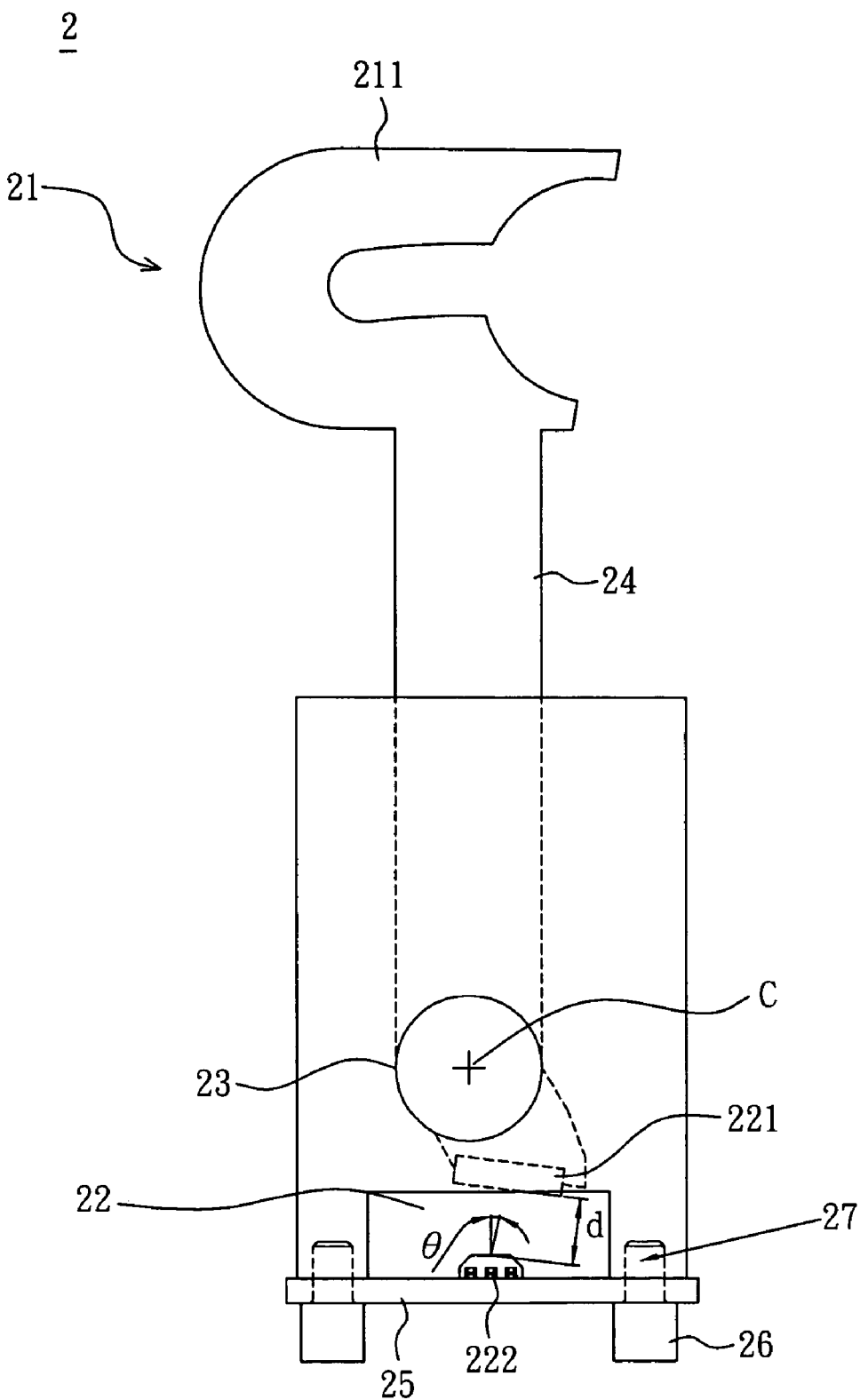
Figure 7:
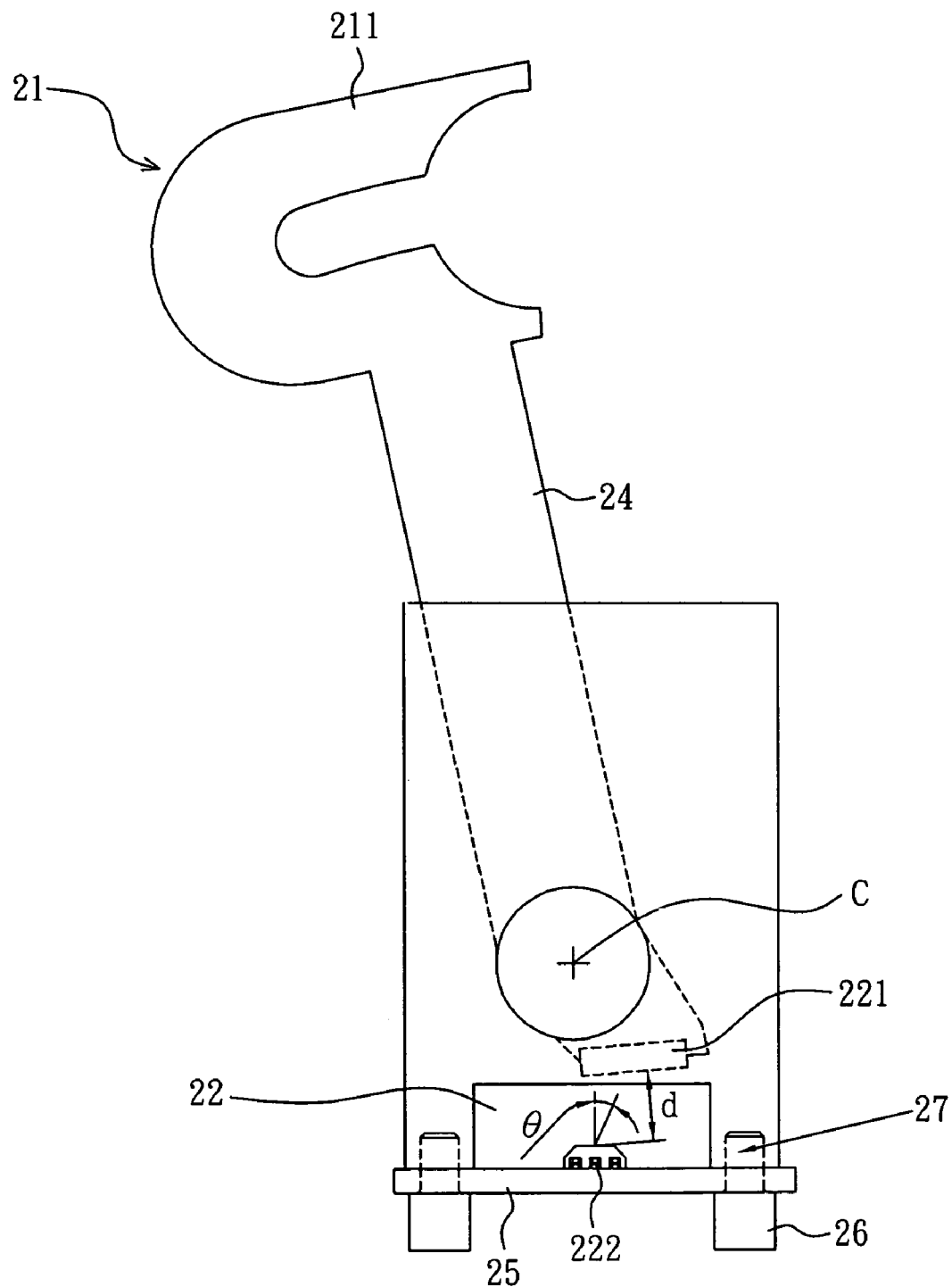

With reference to FIGS. 6 and 7, when the driving element 23 drives the magnetic element 221 to rotate with respect to the rotation center 'C' according to an action signal of the control signal, the magnetic element 221 produces a relative motion with respect to the magnetic sensor 222 and the light intercepting element 21 is shifted so as to control the size of the iris diaphragm.

Figure 9:
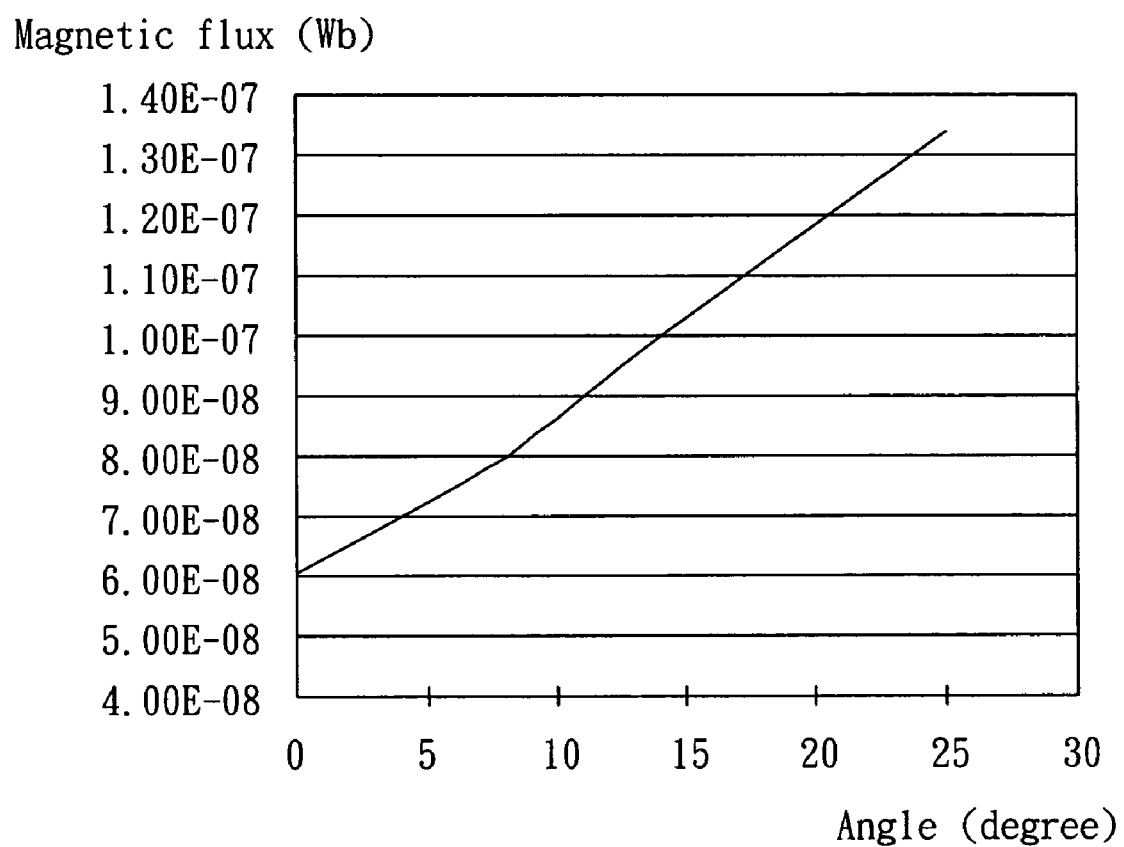
FIG. 9 is a graph showing that the magnetic flux sensed by the magnetic sensor and the angle with the magnetic element has a substantially linear relation for the disclosed iris diaphragm actuator, magnetic position sensing structure, and the arrangement method thereof.

The magnetic flux between the magnetic element 221 and the magnetic sensor 222 is inversely proportional to the square of the distance and the magnetic flux sensed in the magnetic flux density sensing region may be estimated by a following equation:

$$\phi = \int B \cdot dA = BA \cos\theta \qquad (1)$$

where $\phi$ is the magnetic flux, B is a magnetic flux density vector, dA is a unit area vector of the magnetic flux density sensing region of the magnetic sensor 222, and $\theta$ is the angle between the magnetic flux density sensing region and the magnetic flux density vector. In this case, as the magnetic element 221 performs a two-dimensional motion, the distance and the angle between the magnetic element 221 and the magnetic sensor 222 are simultaneously changed. By using the disclosed structure in the embodiment, the distance and angle are changed so that the signal output of the magnetic position sensing structure 22 and the position have a substantially linear relation. That is to say, a magnetic flux sensed by the magnetic sensor 222 and the position of the magnetic element 221 have an almost linear relation, as shown in FIG. 9. Therefore, the driving element 23 can use a linear driving method to achieve the goals of simple structures, easy producing processes, high production yield, low product costs, and no product variations. Herein, the magnetic flux may be the magnetic flux density. That is, the magnetic density sensed by the magnetic sensor 222 has a substantially linear relation with the position of the magnetic element 221. Besides the equation (1), the angle between the magnetic element 221 and the magnetic sensor 222 may satisfy some other relation.

The iris diaphragm actuator 2 of the embodiment can be used in an electronic device such as, but not limited to, camera cell phones, digital cameras, digital video cams, digital light processors (DLP), projectors, or scanners.

With further reference to FIG. 5, the magnetic position sensing structure 22 according to a preferred embodiment of the invention includes a magnetic element 221 and a magnetic sensor 222 relatively disposed. The magnetic element 221 or the magnetic sensor 222 performs a rotating motion with respect to a rotation center "C", so that the distance and angle between the magnetic element 221 and the magnetic sensor 222 change to obtain a substantially linear relation between the magnetic flux sensed by the magnetic sensor 222 and the position of the magnetic element 221.

Figure 8:
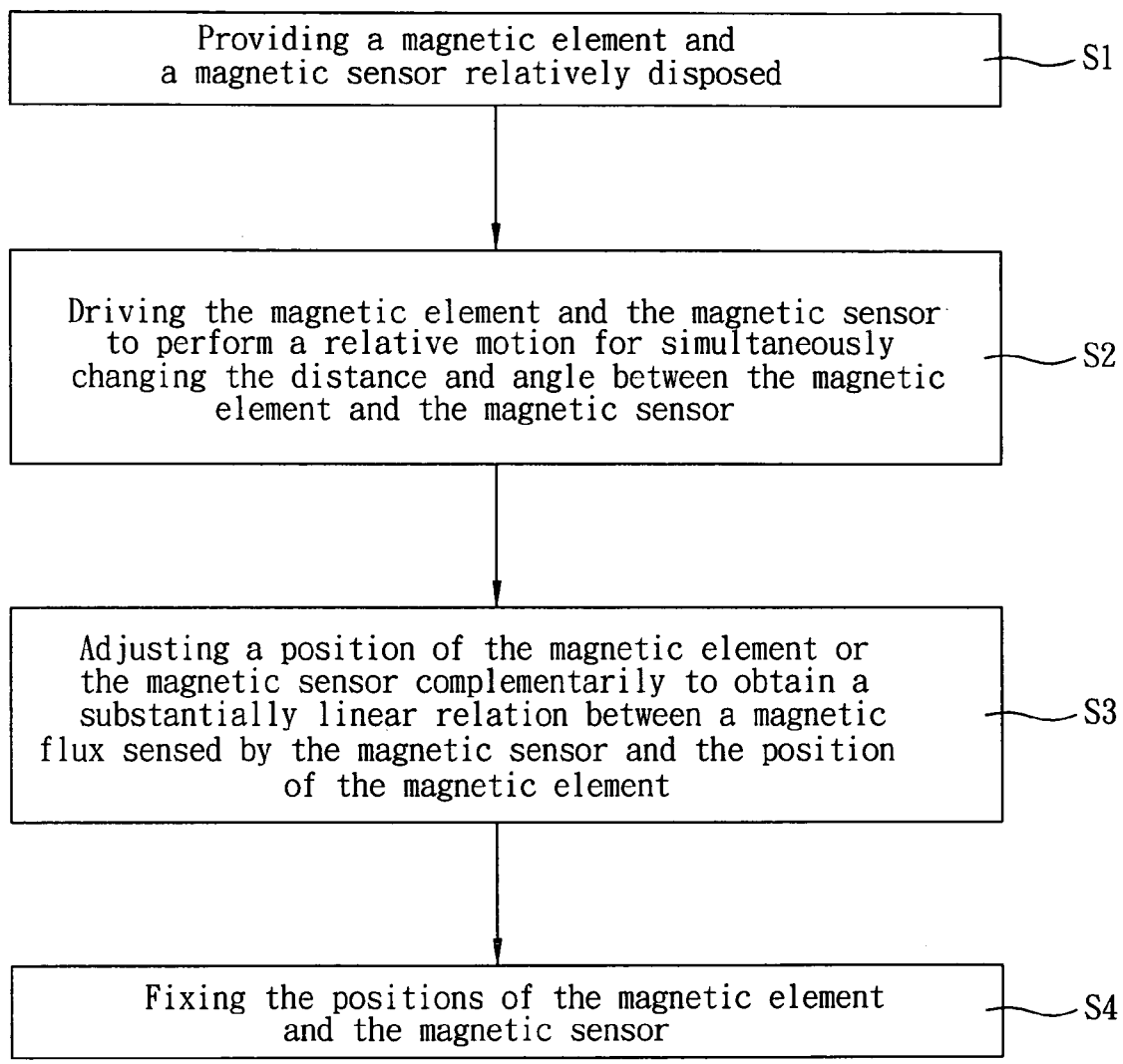
FIG. 8 is a flowchart showing a magnetic position sensing method according to a preferred embodiment of the invention.

FIG. 8 shows an arrangement method of a magnetic position sensing structure according to a preferred embodiment of the invention. The arrangement method includes the following steps S1, S2, S3 and S4. In step S1, a magnetic element and a magnetic sensor are relatively disposed. In step S2, the magnetic element or the magnetic sensor is rotated with respect to a rotation center so that the distance and angle between the magnetic element and the magnetic sensor change simultaneously. In step S3, the position of the magnetic element or the magnetic sensor is adjusted complementarily so as to obtain a substantially linear relation between the magnetic flux sensed by the magnetic sensor and the position of the magnetic element. Finally, in step S4, the initial relative positions of the magnetic element and the magnetic sensor are fixed.

The adjusting step S3 and the fixing step S4 can be achieved by using the above-mentioned adjusting mechanism and fixing element. Therefore, they are not further described here.

In summary, the invention discloses an iris diaphragm actuator, its magnetic position sensing structure and the arrangement method thereof. A single magnetic element or magnetic sensor is disposed with respect to a rotation center. By using the inverse square relation between the distance and the magnetic flux between the magnetic element and the magnetic sensor and the cosine relation with the angle in between (as equation (1)), the distance and the angle between the magnetic element and the magnetic sensor are changed complementarily so as to obtain a substantially linear relation between the signal output of the magnetic position sensing structure and the position. Therefore, it is possible to use a traditional linear driving device and method in the invention. Also, the invention thus has advantages of simple structures, easy manufacturing processes, high production yield, low product costs, and no product variations.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An iris diaphragm actuator, comprising:
    a magnetic position sensing structure comprising a magnetic element and a magnetic sensor relatively disposed;
    a driving element coupled to the magnetic element or the magnetic sensor for changing a distance and an angle between the magnetic element and the magnetic sensor so as to obtain a substantially linear relation between a magnetic flux sensed by the magnetic sensor and a position of the magnetic element; and
    a light intercepting element connected to the driving element,
    wherein the magnetic sensor has a magnetic flux density sensing region and the magnetic flux sensed in the magnetic flux density sensing region is estimated by a following equation:

$$\phi = \int B \cdot dA = BA \cos \theta \qquad (1)$$

wherein $\phi$ is the magnetic flux, B is a magnetic flux density vector, dA is a unit area vector of the magnetic flux density sensing region, and $\theta$ is the angle between the magnetic flux density sensing region and the magnetic flux density vector.

2. The iris diaphragm actuator of claim 1, wherein the driving element drives the magnetic element or the magnetic sensor to perform a rotating motion with respect to a rotation center so that the distance and the angle between the magnetic element and the magnetic sensor change simultaneously.

3. The iris diaphragm actuator of claim 1, wherein the driving element is a linear driving element, and the magnetic sensor is a non-contact magnetic sensor, a Hall sensor or a magneto-resistive sensor.

4. The iris diaphragm actuator of claim 1, further comprising:
    at least one adjusting mechanism disposed between the magnetic element and the magnetic sensor for adjusting initial relative positions of the magnetic element and the magnetic sensor when the magnetic element or the magnetic sensor performs the rotating motion with respect to the rotation center and changes the distance and the angle between the magnetic element and the magnetic sensor.

5. The iris diaphragm actuator of claim 1, wherein the adjusting mechanism comprises an elastic element or a spring.

6. The iris diaphragm actuator of claim 4, further comprising at least one fixing element for fixing the magnetic element and the magnetic sensor, wherein the fixing element fixes the magnetic element and the magnetic sensor by way of screw fastening, adhesion, coupling, or locking.

7. The iris diaphragm actuator of claim 1, which is applied to a camera cell phone, a digital camera, a digital video cam, a digital light processor, a projector, or a scanner.

8. A magnetic position sensing structure, comprising:
    a magnetic element; and
    a magnetic sensor disposed corresponding to the magnetic element, wherein the magnetic element and the magnetic sensor perform a relative motion so that a distance and an angle between the magnetic element and the magnetic sensor are changed to obtain a substantially linear relation between a magnetic flux sensed by the magnetic sensor and the position of the magnetic element,
    wherein the magnetic sensor has a magnetic flux density sensing region and the magnetic flux sensed in the magnetic flux density sensing region is estimated by a following equation:

$$\phi = \int B \cdot dA = BA \cos \theta \qquad (1)$$

wherein $\phi$ is the magnetic flux, B is a magnetic flux density vector, dA is a unit area vector of the magnetic flux density sensing region, and $\theta$ is the angle between the magnetic flux density sensing region and the magnetic flux density vector.

9. The magnetic position sensing structure of claim 8, wherein the magnetic element or the magnetic sensor performs a rotating motion with respect to a rotation center so that the distance and the angle between the magnetic element and the magnetic sensor change simultaneously.

10. The magnetic position sensing structure of claim 8, wherein the magnetic sensor is a non-contact magnetic sensor, a Hall sensor or a magneto-resistive sensor.

11. The magnetic position sensing structure of claim 8, which is applied to a camera cell phone, a digital camera, a digital video cam, a digital light processor, a projector, or a scanner.

12. An arrangement method of a magnetic position sensing structure, comprising steps of:
provide a magnetic element and a magnetic sensor relatively disposed;
driving the magnetic element and the magnetic sensor to perform a relative motion for simultaneously changing a distance and an angle between the magnetic element and the magnetic sensor;
adjusting a position of the magnetic element or the magnetic sensor so as to obtain a substantially linear relation between a magnetic flux sensed by the magnetic sensor and the position of the magnetic element; and
fixing initial relative positions of the magnetic element and the magnetic sensor,
wherein the magnetic sensor has a magnetic flux density sensing region and the magnetic flux sensed in the magnetic flux density sensing region is estimated by a following equation:

$$\phi = \int B \cdot dA = BA \cos \theta \tag{1}$$

wherein $\phi$ is the magnetic flux, B is a magnetic flux density vector, dA is a unit area vector of the magnetic flux density sensing region, and $\theta$ is the angle between the magnetic flux density sensing region and the magnetic flux density vector.

13. The arrangement method of claim 12, wherein the magnetic element or the magnetic sensor is driven to perform a rotating motion with respect to a rotation center so that the distance and the angle between the magnetic element and the magnetic sensor change simultaneously.

14. The arrangement method of claim 12, wherein the magnetic sensor is a non-contact magnetic sensor, a Hall sensor or a magneto-resistive sensor.

15. The arrangement method of claim 12, wherein the step of adjusting the position of the magnetic element or the magnetic sensor is executed with at least one adjusting mechanism.

16. The arrangement method of claim 15, wherein the adjusting mechanism comprises an elastic element or a spring.

17. The arrangement method of claim 12, wherein the step of fixing the initial relative position of the magnetic element and the magnetic sensor is performed with at least one fixing element, and the fixing element fixes the magnetic element and the magnetic sensor by way of screw fastening, adhesion, coupling, or locking.

* * * * *